United States Patent
Dauriac et al.

(10) Patent No.: US 10,059,460 B2
(45) Date of Patent: Aug. 28, 2018

(54) METHOD AND ARCHITECTURE FOR THE OPTIMIZED TRANSFER OF POWER BETWEEN AN AUXILIARY POWER MOTOR AND THE MAIN ENGINES OF A HELICOPTER

(71) Applicants: SAFRAN POWER UNITS, Bordes (FR); SAFRAN HELICOPTER ENGINES, Toulouse (FR)

(72) Inventors: Pascal Dauriac, Rontignon (FR); Olivier Bedrine, Bosdarros (FR); Patrick Marconi, Gelos (FR); Jean-Francois Rideau, Tournefeuille (FR)

(73) Assignees: SAFRAN HELICOPTER ENGINES, Bordes (FR); SAFRAN POWER UNITS, Toulouse (FR)

( * ) Notice: Subject to any disclaimer, the term of this patent is extended or adjusted under 35 U.S.C. 154(b) by 0 days.

(21) Appl. No.: 14/406,054

(22) PCT Filed: Jun. 12, 2013

(86) PCT No.: PCT/FR2013/051376
§ 371 (c)(1),
(2) Date: Dec. 5, 2014

(87) PCT Pub. No.: WO2014/009620
PCT Pub. Date: Jan. 16, 2014

(65) Prior Publication Data
US 2015/0122944 A1    May 7, 2015

(30) Foreign Application Priority Data
Jun. 15, 2012 (FR) ..................... 12 55599

(51) Int. Cl.
*B64D 35/08* (2006.01)
*B64D 41/00* (2006.01)
(Continued)

(52) U.S. Cl.
CPC ............. *B64D 35/08* (2013.01); *B64D 41/00* (2013.01); *F02C 6/02* (2013.01); *F02C 7/277* (2013.01);
(Continued)

(58) Field of Classification Search
CPC . B64D 41/00; B64D 35/08; F02C 6/02; F02C 7/277
See application file for complete search history.

(56) References Cited

U.S. PATENT DOCUMENTS 3,455,182 A * 7/1969 Kelley ................... B64C 27/12
                                                              244/17.11
3,963,372 A    6/1976 McLain et al.
(Continued)

FOREIGN PATENT DOCUMENTS

EP    0 490 755 A1    6/1992
EP    2 452 876 A2    5/2012
(Continued)

OTHER PUBLICATIONS

International Search Report dated Aug. 26, 2013 in PCT/FR2013/051376 Filed Jun. 12, 2013.

*Primary Examiner* — Richard R Green
(74) *Attorney, Agent, or Firm* — Oblon, McClelland, Maier & Neustadt, L.L.P

(57) ABSTRACT

A method and architecture to optimize an entire traction system available on a helicopter by using an auxiliary engine to provide energy to equipment and accessories of the helicopter connected to the engines. Main engines and an APU unit, as an auxiliary engine, include a gas generator
(Continued)

connected to, for the main engines, a reduction gearbox and an accessory gearbox for mechanical, electrical, and/or hydraulic power take-off and connected to, for the APU unit, at least one power conversion member. The power conversion member of the APU unit is connected to the equipment and accessories by the reduction gearbox and/or the accessory gearbox of the main engines.

12 Claims, 3 Drawing Sheets

(51) Int. Cl.
    *F02C 6/02*    (2006.01)
    *F02C 7/277*   (2006.01)

(52) U.S. Cl.
    CPC .. *B64D 2041/002* (2013.01); *F05D 2220/329* (2013.01); *Y02T 50/53* (2013.01)

(56) References Cited

U.S. PATENT DOCUMENTS

| | | | |
|---|---|---|---|
| 5,054,716 A | | 10/1991 | Wilson |
| 5,239,830 A | * | 8/1993 | Banthin .................... F02C 6/02 |
| | | | 60/39.15 |
| 6,098,921 A | * | 8/2000 | Piasecki ................. B64C 27/14 |
| | | | 244/60 |
| 9,422,863 B2 | * | 8/2016 | Bedrine .................... F02C 6/02 |
| 2012/0119020 A1 | | 5/2012 | Burns et al. |
| 2013/0098052 A1 | | 4/2013 | Bedrine et al. |

FOREIGN PATENT DOCUMENTS

| | | |
|---|---|---|
| GB | 2460246 A | 11/2009 |
| WO | WO 2012/004516 A1 | 1/2012 |

* cited by examiner

METHOD AND ARCHITECTURE FOR THE OPTIMIZED TRANSFER OF POWER BETWEEN AN AUXILIARY POWER MOTOR AND THE MAIN ENGINES OF A HELICOPTER

TECHNICAL FIELD

The invention relates to a method for the optimised transfer of energy between an auxiliary power engine, in particular an auxiliary power unit (APU), and the main engines of a helicopter, as well as to an architecture for implementing this method.

Helicopters are equipped with main engines, which provide propulsion, and sometimes with an auxiliary engine. Currently, the auxiliary engines are APU units, which are small gas turbines, and provide non-propulsive power—electrical, mechanical, hydraulic and/or pneumatic—in the flight phases in which the main engines cannot provide this: on the ground, in transition phases (take-off, landing), in search phases, etc.

When the main engines are in operation, the APU unit is switched off. If an engine fails (also referred to as 'one engine inoperative' (OEI)), the remaining engine is required to accelerate rapidly.

The APU units therefore remain switched off during flight and are thus an unnecessary load. The invention relates to optimising the use of the APU units in order to make their presence cost-effective.

PRIOR ART

An engine basically conventionally comprises a gas generator made up of a compressor—combustion chamber—turbine assembly arranged between an air inlet and an exhaust pipe. In operation, the fuel is injected into the chamber and the combustion of the fuel/air mixture provides gases that produce energy. These hot gases are expanded in the turbine which mechanically drives the compressor via a high-pressure (HP for short) shaft. The drive shaft also transmits the available power to the equipment and accessories that use energy. This type of architecture and operation is applicable to both main engines and APU units.

For the main engines, the power is transmitted to the helicopter rotor via a reduction gearbox. The modern engines also have a free power turbine for driving the reduction gearbox. The combustion gases are subject to a second expansion in the free turbine. On the shaft of this free turbine, in addition to the rotor, the reduction gearbox drives equipment that uses energy, namely a pump, an alternator and/or a load compressor.

In a simplified architecture without a free turbine, the reduction gearbox (or, in the simplest solution, the equipment directly) is mounted on the HP shaft of the gas generator. For the APU units, the turbine drives the consumer accessories via a gearbox mounted on the shaft.

Generally, the APU units remain an unnecessary load during flight and the capacity for providing power via the entire available traction system is not optimised.

DESCRIPTION OF THE INVENTION

The invention aims to optimise the entire traction system available on a helicopter by using an auxiliary engine to provide energy to the equipment and accessories on the helicopter. 'Auxiliary engine' means any thermal system that allows power to be provided, such as an APU unit, but also generally means a gas turbine or a thermal engine, for example a diesel engine, or a fuel cell.

More specifically, the present invention relates to a method for the optimised transfer of energy between an auxiliary engine and the main engines of a helicopter, consisting in providing all available power generated by the auxiliary engine to the main engines by connecting the drive shaft of the auxiliary engine to the drive shaft and/or the power transmission shaft of each main engine via at least one power adaptation, in flight phases in which the power generated by the auxiliary engine is added to the power generated by at least one main engine. In these conditions, the auxiliary engine may participate in increasing the propulsive power and/or in providing non-propulsive power. The power adaptation is a mechanical adaptation or a conversion of mechanical power into electrical, pneumatic and/or hydraulic power.

According to preferred embodiments:
- the drive shaft of the auxiliary engine is connected to at least one main engine on one of the shafts of said main engine selected from the drive shaft of an architecture having a connected-turbine engine, the drive shaft of the gas generator and/or the power transmission shaft of an architecture having a free-turbine engine;
- the supply of power from the auxiliary engine is adjusted between the main engines in order to tend towards an equilibrium of power between said engines by compensating the asymmetrical operation of said engines if this asymmetry is caused involuntarily by a partial malfunction of one of the engines, and by supply to the loaded engine in the case of voluntary asymmetry, depending on the mission phases of the helicopter;
- the supply of mechanical power generated by the auxiliary engine is converted into a type of energy selected from energy of an electrical, pneumatic, mechanical and/or hydraulic nature;
- since the auxiliary engine is a gas turbine, an exchange of heat takes place between the exhaust gases from each main engine and the compression air output from the auxiliary engine in order to recover the heat energy from the exhaust gases at least in part and to re-inject the air thus heated upstream of the combustion of the gases from the auxiliary engine;
- the auxiliary engine operates in a switched-off chamber, without any fuel being supplied, when the exhaust gases from the main engines supply sufficient heat energy to the auxiliary engine to serve as a heat source.

The invention also relates to an architecture for the optimised transfer of energy between an auxiliary engine and the main engines of a helicopter, capable of implementing the above-described method. The main engines comprise a gas generator connected to a reduction gearbox and an accessory gearbox for mechanical, electrical and/or hydraulic power take-off and connected to, for the auxiliary engine, at least one power conversion member. In this architecture, the power conversion member of the auxiliary engine is connected to the equipment and accessories either directly or by the reduction gearbox and/or the accessory gearbox of the main engines.

According to particular embodiments:
- since the main engines are equipped with a free turbine mounted on a power transmission shaft, the reduction gearbox is engaged with the power transmission shaft of the free turbine;
- the power conversion member of the auxiliary engine is selected from an electrical generator for transmitting electrical power, a load compressor for transmitting pneumatic power and a gearbox for transmitting mechanical or hydraulic power;

the main engines being equipped with a gas exhaust pipe and with a recovery heat exchanger integrated into this pipe, the auxiliary engine being a gas turbine equipped with a gas generator—formed by a compressor, a combustion chamber and a turbine which are mounted on a drive shaft—is connected at the outlet of the air compressor to the heat exchanger of the exhaust pipe of the main engines and this exchanger is coupled, at the outlet, upstream of the combustion chamber of the gas generator of the auxiliary engine;

the auxiliary engine and the main engines have digital control units of the full authority digital engine control (FADEC) type, which transmit information relating to the torques and speeds of the power transmission shafts, this information being centralised in a flight control unit in order to adjust the transmission of power from the auxiliary engine to the main engines depending on the operating state of each of the main engines relative to torque and speed limit values.

BRIEF DESCRIPTION OF THE FIGURES

Other aspects, features and advantages of the invention will become apparent from the following non-limiting description, relating to particular embodiments, with reference to the accompanying drawings, in which.

DETAILED DESCRIPTION OF EMBODIMENTS

In all the figures, identical or similar elements having the same function are provided with identical or similar reference signs.

Figure 1:
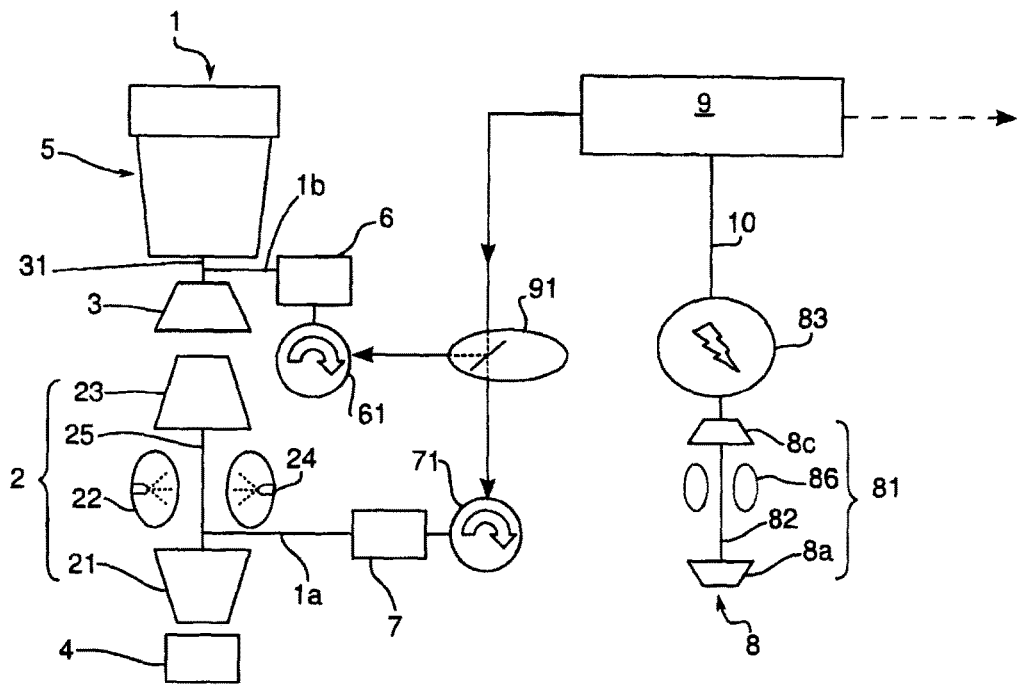
FIG. 1 is a diagram of an architecture for transferring energy according to the invention in which energy is supplied to a main helicopter engine from an APU unit via an electrical coupling.

With reference to FIG. 1, the diagram of an architecture according to the invention is simplified by only showing one of the two main engines of a helicopter, the other engine being identical and being connected symmetrically in a similar manner to the APU unit. The main engines, such as the main engine 1 shown, comprise a gas generator 2 formed by an assembly made up of a compressor 21 coupled to a combustion chamber 22, which is in turn coupled to a turbine 23. The engine also comprises a free turbine 3 which drives a power transmission shaft 31. The gas generator 2 and the free turbine 3 are arranged between an air inlet 4 and a gas exhaust pipe 5.

In operation, the chamber 22 is fed with fuel by injectors 24, into which air compressed by the compressor 21 is also drawn. The combustion of the air/fuel mixture in the chamber 22 provides high-velocity gases that produce energy. These hot gases are first expanded in the turbine 23 which mechanically drives the compressor 21 via an HP drive shaft 25 and then in the free turbine 3.

The main engine 1 transmits mechanical power to the rotor of the helicopter and to equipment and accessories via a speed reduction gearbox 6, in particular to an electric motor 61 in the example shown which relates to the electrical transmission of power. The engine 1 also transmits mechanical power to other equipment or accessories via an accessory gearbox 7, in particular to an electric motor 71 within the context of the example. Mechanical take-off shafts 1a and 1b connect the drive shafts 25 and transmission shafts 31 to the gearboxes 6 and 7.

The diagram of an architecture shown in FIG. 1 also shows an APU unit 8 which comprises, like the main engines, a gas generator 81 comprising a compressor 8a, a combustion chamber 86 and a turbine 8c. The drive shaft 82 of the gas generator 81 of the APU unit 8 is coupled to an electrical generator 83 which transforms the mechanical energy transmitted by the shaft 82 into electrical energy. The current provided to the helicopter network 9 by the conductor 10 may thus be transmitted to the electrical equipment or accessories mounted on the reduction gearbox 6 and accessory gearbox 7 of the main engine 1. In the example, the electric motors 61 and/or 71 are energised by being electrically connected to the network 9 which is supplied with power by the generator 83 via a selector gearbox 91.

Figure 2:
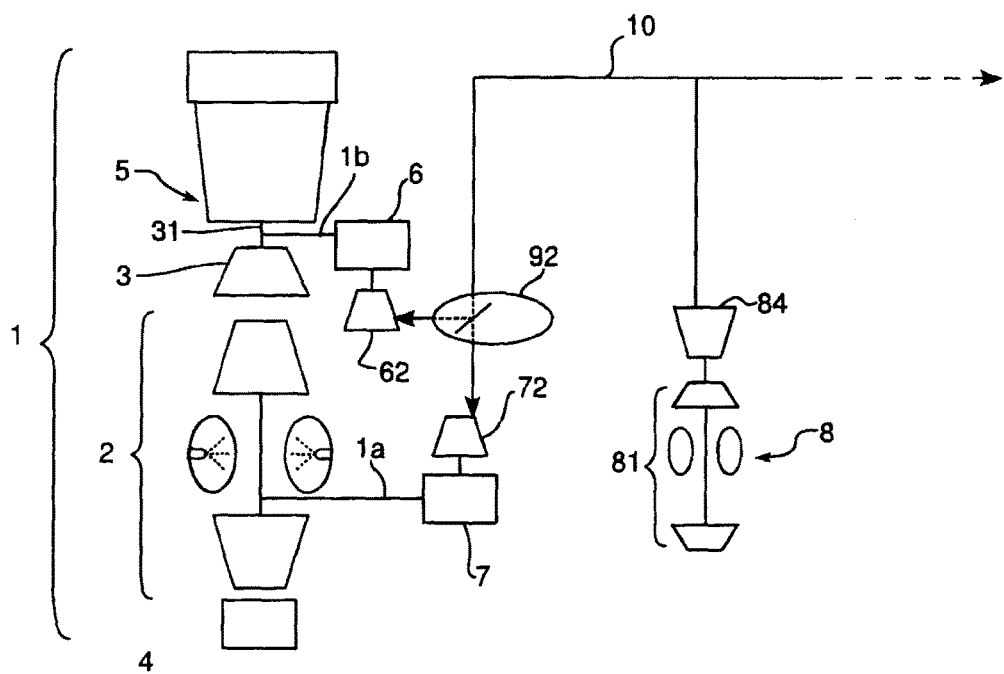
FIG. 2 is a diagram of an architecture according to the invention in which energy is supplied to a main engine from the APU unit via a pneumatic coupling.

Another example, shown by the diagram in FIG. 2, relates to the pneumatic transmission of power. In this case, the APU unit drives a load compressor 84 which generates an air flow at a pressure sufficient for supplying pneumatic equipment with power. This equipment is mounted on the reduction gearbox 6 and accessory gearbox 7 so as to be mechanically connected to the main engine 1 via the shafts 1a and 1b. In the example, the auxiliary air-conditioning turbines 62 and 72 which are mounted on the reduction gearbox 6 and accessory gearbox 7 are supplied with power by the load compressor 84 via air ducts 20 and a pneumatic selector 92, for example a three-way valve. The air leaving the turbines 62 and 72 participates for example in ventilating the engine bay which groups together the electronic equipment of the entire traction system of the helicopter.

Figure 3:
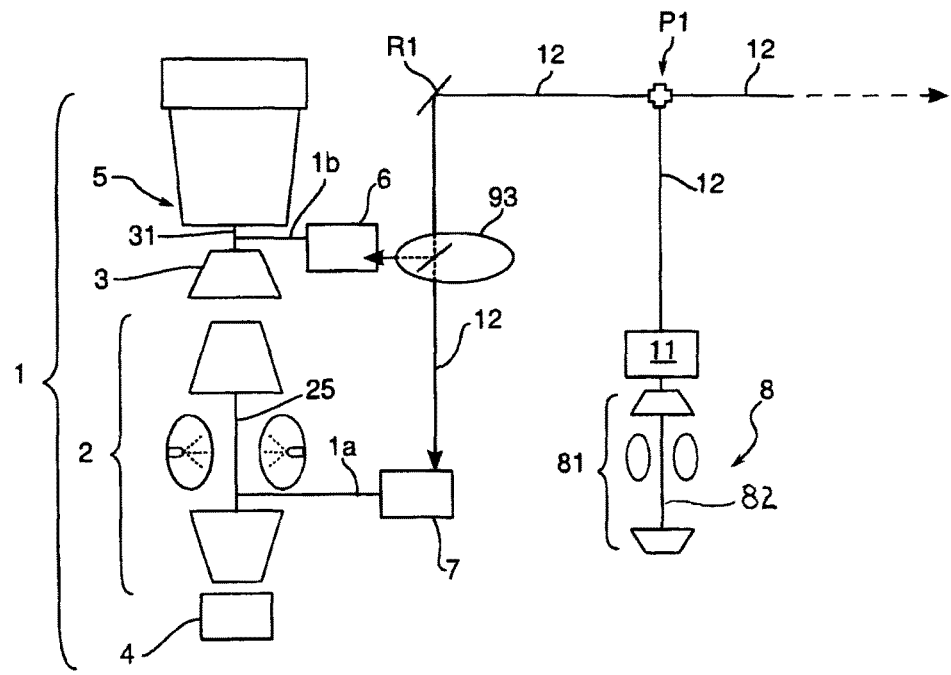
FIG. 3 is a diagram of an architecture according to the invention in which energy is supplied to a main engine from the APU unit via a mechanical or hydraulic coupling.

In another example shown by the diagram in FIG. 3, mechanical and hydraulic power is transmitted by a gearbox 11 driven by the gas generator 81 in the APU unit 8. The gearbox 11 is coupled to the reduction gearbox 6 and/or to the accessory gearbox 7 via the drive shaft 82 and transmission shafts 12 coupled by a system of pinions P1, a return R1 and a system of releasable gears 93. These gearboxes are also mounted on the drive shafts 25 and 31 of the main engine 1. The energy provided by the APU unit 8 allows in particular a pump or an additional engine to be driven.

Figure 4:
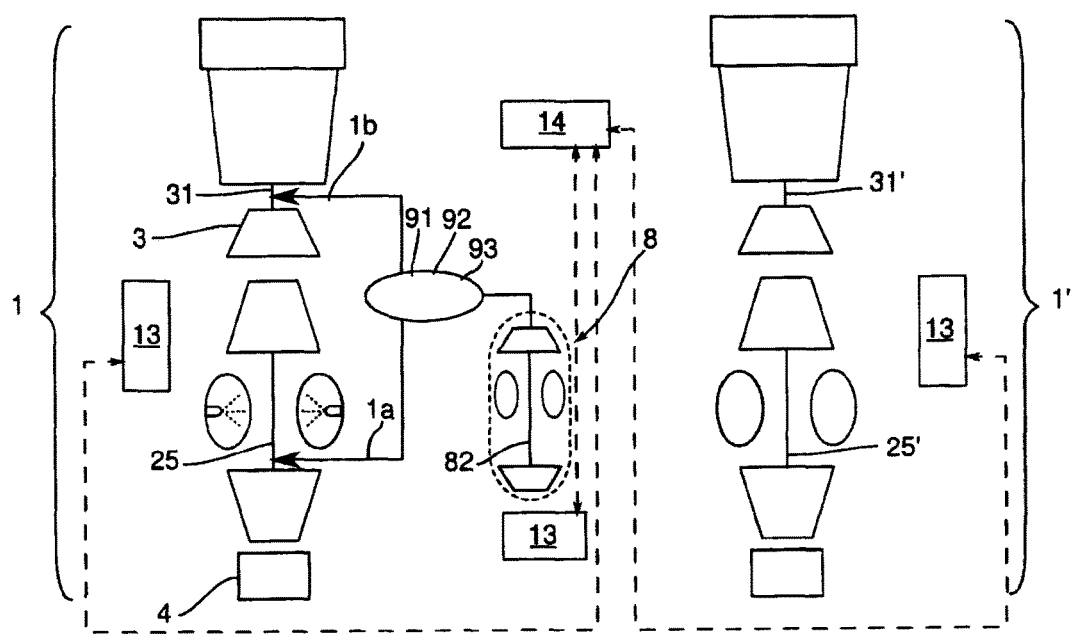
FIG. 4 is a diagram of an architecture of a coupling between the APU and main engines according to the invention, in the case of asymmetrical operation of the engines.

Advantageously, the electrical 83, pneumatic 84, hydraulic and/or pneumatic 11 power conversion members may be grouped together in the same transfer gearbox. A selector controlled by the FADEC of the APU unit (see the description below with reference to FIG. 4) and integrated into this transfer gearbox allows the conversion member which provides the desired type of energy to be coupled. The FADEC 13 of the APU unit 8 also controls, by being connected to the flight control unit 14 (see also the description below with reference to FIG. 4), the connections in "and/or" modes of the selection system 91, 92 and 93 (FIGS. 1 to 3) to the gearboxes 6 and 7, which are connected to the shafts 31 and 25 of the engine 1 via the take-off shafts 1a and 1b or to the equipment such as the electric motors 61, 71 and the turbines 62, 72.

The APU unit thus contributes to improving the efficiency of the main engines and therefore to optimising the power density of the on-board traction system. It is in fact possible either to increase the available power or to reduce the dimensions and masses of the main engines having equal available power.

Moreover, the main engines of the helicopter can operate according to two modes: in nominal operation, in which the main engines provide the same power, and in asymmetrical operation in which one of the engines provides significantly more power. This asymmetrical operation may occur when one of the engines has partially or totally malfunctioned or, in a voluntary manner, in a particular phase of the mission of the helicopter, for example in the event of a search in a particular environment.

In the case of involuntary asymmetrical operation, the power provided by the APU unit may be applied as a priority to the partially malfunctioning engine in order re-establish equilibrium in the propulsion. In the case of voluntary asymmetrical operation, the power provided by the APU unit is applied to the loaded engine in order to relieve the load thereon. In all cases of asymmetrical operation, as shown by the diagram in FIG. 4, the APU unit 8 and the main engines 1 and 1' have digital control units 13 of the FADEC type, which transmit information relating to torques and speeds of the drive shafts and the power transmission shafts 25, 25', 31, 31', 82. This information is centralised in the flight control unit 14 in order to adjust the transmission of power from the APU unit 8 to the main engines 1, 1' and to the equipment thereof via the selection systems 91, 92, 93 as well as the take-off shafts 1a and 1b, depending on the operating state of each of these main engines relative to torque and speed limit values.

In the case of a total failure of one of the engines, namely the special OEI regime, the power from the APU unit is dedicated as a priority to the attempts to restart this engine. In the case of voluntary asymmetrical operation, the power from the APU unit is dedicated as a priority to relieving the load on the engine that is the most loaded.

Figure 5:
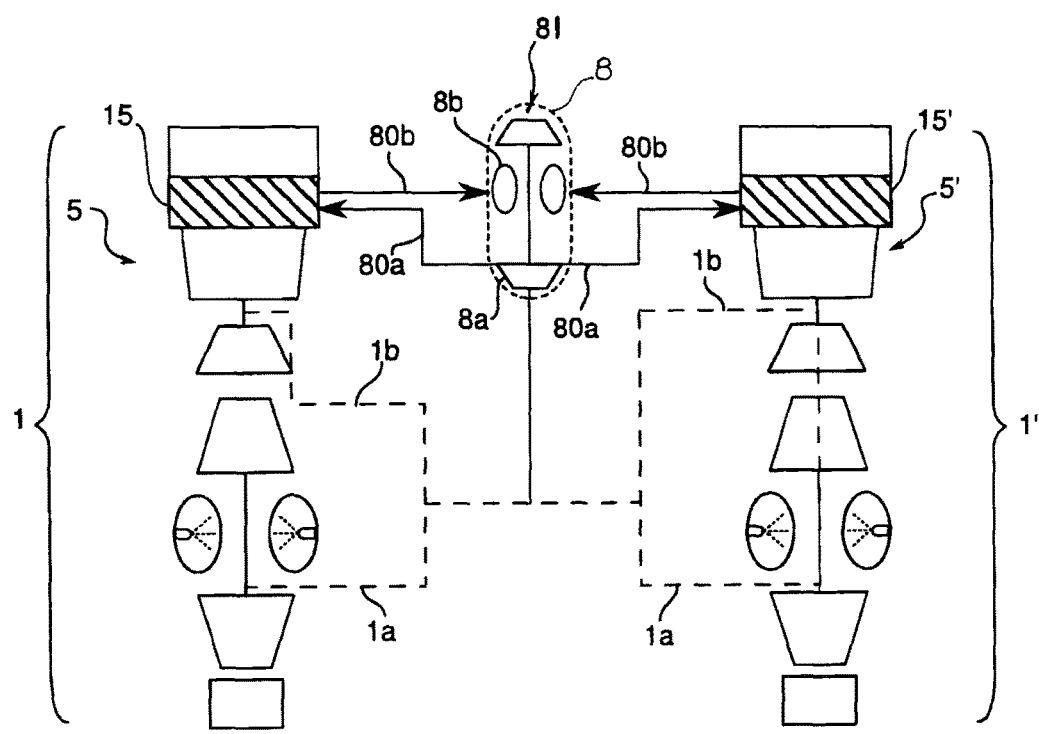
FIG. 5 is a diagram of an architecture according to the invention in which energy is supplied to the APU unit from the main engines via a heat exchanger at the exhaust.

In order to optimise the specific consumption of the entire APU/main-engine traction system or, more generally, the gas-turbine/main-engine traction system, recovery of the heat energy at the exhaust may also be provided in combination with the supply of energy from the APU unit to the main engines via the take-off shafts 1a and 1b. As shown by the diagram in FIG. 5, each exhaust pipe 5 and 5' of the main engines 1 and 1' is integrated into a heat exchanger 15, 15'. These exchangers recover at least a significant part of the heat energy from the exhaust gases.

The energy recovery fluid which circulates in the exchangers 15 and 15' is removed at the outlet of the compressor 8a of the APU unit 8 and is re-introduced just upstream of its combustion chamber 8b. Ducts 80a and 80b ensure that the fluid circulates between the exchangers 15, 15' and the gas generator 81 of the APU unit 8.

In these conditions, with equal performance, the supply of heat provided by the combustion of the fuel in the APU unit may be reduced because this reduction is compensated by the supply of heat originating from the exchangers 15 and 15'. The amount of fuel required by the entire traction system is thus reduced. This reduction in fuel may be advantageous during stabilised flight phases, for example during cruising phases, which are generally the longest phases.

When the recovery of heat energy is particularly high, it is possible to stop injecting fuel into the combustion chamber of the APU unit 8. In this case, the only heat source for the APU unit comes from the exhaust gases from the main engines 1 and 1' and via the exchangers 15 and 15'. The energy optimisation of the entire traction system is thus maximised.

The invention is not limited to the examples which are described and shown.

It is for example possible to apply the invention to main connected-turbine engines by coupling the drive shaft of the APU unit or, more generally, of an auxiliary engine, to equipment and accessories that are directly connected to the drive shafts of the main connected-turbine engines or via a reduction gearbox and/or an accessory gearbox. The scope of the term 'auxiliary engine' extends to engines using technology that is different from that of a gas turbine (for example: a diesel engine, a fuel cell, etc.). Thus, this auxiliary engine may be the engine of a three-turbine helicopter which has smaller dimensions and inferior performance compared with the dimensions and performance of the two other main engines.

The invention claimed is:

1. A method for optimized transfer of energy between an auxiliary engine and main engines of a helicopter, the method comprising:
    providing propulsive power with the main engines and providing non-propulsive power with the auxiliary engine; and
    in certain flight phases, adding power generated by the auxiliary engine to power generated by the main engines by connecting a drive shaft of the auxiliary engine to at least one drive shaft and/or power transmission shaft of at least one of the main engines via at least one power adaptation, so that the auxiliary engine provides propulsive power necessary during the flight phases to reduce dimensions and mass of the main engines of the helicopter,
    wherein the adding power includes adding all available power generated by the auxiliary engine to the power generated by the main engines by connecting the drive shaft of the auxiliary engine to the at least one drive shaft and/or power transmission shaft of the at least one of the main engines via the at least one power adaptation.

2. A method for transferring energy according to claim 1, wherein the drive shaft of the auxiliary engine is connected to at least one of the main engines on one of shafts of the at least one of the main engines selected from a drive shaft of an architecture having a connected-turbine engine, a drive shaft of a gas generator and/or the power transmission shaft of an architecture having a free-turbine engine.

3. A method for transferring energy according to claim 1, wherein a supply of power from the auxiliary engine is adjusted between the main engines to tend towards an equilibrium of power between the main engines by compensating an asymmetrical operation of the main engines when an asymmetry is caused involuntarily by a partial malfunction of one of the main engines, and by supply to a loaded motor in a case of voluntary asymmetry, depending on mission phases of the helicopter.

4. A method for transferring energy according to claim 1, wherein a supply of mechanical power generated by the auxiliary engine is converted into a type of energy selected from energy of an electrical, pneumatic, mechanical, and/or hydraulic nature.

5. A method for transferring energy according to claim 4, wherein the auxiliary engine is a gas turbine, and an exchange of heat takes place between exhaust gases from each of the main engines and compression air output from the auxiliary engine to recover heat energy from the exhaust gases at least in part and to re-inject air thus heated upstream of combustion of gases from the auxiliary engine.

6. A method for transferring energy according to claim 5, wherein the auxiliary engine operates in a switched-off chamber, without any fuel being supplied, when the exhaust gases from the main engines supply sufficient heat energy to the auxiliary engine to serve as a heat source.

7. An architecture, configured to implement the method according to claim 1, for optimized transfer of energy between the auxiliary engine and the main engines of the helicopter, the architecture comprising:
the auxiliary engine and the main engines,
wherein the main engines comprise a gas generator connected to a reduction gearbox and to an accessory gearbox for mechanical, electrical, and/or hydraulic power take-off and connected to, for the auxiliary engine, at least one power conversion member, and
the power conversion member of the auxiliary engine is connected to equipment and accessories, via a selector gearbox, by at least one of the reduction gearbox and the accessory gearbox of the main engines.

8. An architecture for transferring energy according to claim 7, wherein the main engines include a free turbine mounted on a power transmission shaft, and the reduction gearbox is engaged with the power transmission shaft of the free turbine.

9. An architecture for transferring energy according to claim 8, wherein the main engines include a gas exhaust pipe and a recovery heat exchanger integrated into the gas exhaust pipe, the auxiliary engine being a gas turbine including a gas generator formed by a compressor, a combustion chamber, and a turbine which are mounted on a drive shaft, connected at an outlet of the compressor to the heat exchanger of the gas exhaust pipe of the main engines, and the heat exchanger is coupled, at the outlet, upstream of the combustion chamber of the gas generator of the auxiliary engine.

10. An architecture for transferring energy according to claim 7, wherein the auxiliary engine and the main engines include digital control units of FADEC type, which transmit information relating to torques and speeds of drive shafts and power transmission shafts, the information being centralized in a flight control unit to adjust transmission of power from the auxiliary engine to the main engines depending on an operating state of each of the main engines relative to torque and speed limit values.

11. A method for transferring energy according to claim 1, wherein the at least one power adaptation includes at least one of a mechanical adaptation, and a converter of mechanical power into at least one of electrical, pneumatic, and hydraulic power.

12. A method for transferring energy according to claim 1, wherein the auxiliary engine provides the non-propulsive power via the at least one power adaptation.

* * * * *

UNITED STATES PATENT AND TRADEMARK OFFICE
CERTIFICATE OF CORRECTION

| | |
|---|---|
| PATENT NO. | : 10,059,460 B2 |
| APPLICATION NO. | : 14/406054 |
| DATED | : August 28, 2018 |
| INVENTOR(S) | : Pascal Dauriac et al. |

Page 1 of 1

It is certified that error appears in the above-identified patent and that said Letters Patent is hereby corrected as shown below:

On the Title Page

In Column 1, item (71), Applicants, Line 1, delete "SAFRAN POWER UNITS, Bordes (FR); SAFRAN HELICOPTER ENGINES, Toulouse (FR)" and insert -- SAFRAN POWER UNITS, Toulouse (FR); SAFRAN HELICOPTER ENGINES, Bordes (FR) --, therefor.

Signed and Sealed this
Twenty-eighth Day of April, 2020

Andrei Iancu
*Director of the United States Patent and Trademark Office*